United States Patent
Harada et al.

(10) Patent No.: US 7,673,904 B2
(45) Date of Patent: Mar. 9, 2010

(54) DEVICE FOR REINFORCING VEHICLE BODY OF VEHICLE

(75) Inventors: Toyoji Harada, Shizuoka-ken (JP); Kouji Sakai, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 168 days.

(21) Appl. No.: 11/816,948

(22) PCT Filed: Feb. 8, 2006

(86) PCT No.: PCT/JP2006/302154

§ 371 (c)(1),
(2), (4) Date: Aug. 23, 2007

(87) PCT Pub. No.: WO2006/090586

PCT Pub. Date: Aug. 31, 2006

(65) Prior Publication Data

US 2009/0079232 A1    Mar. 26, 2009

(30) Foreign Application Priority Data

Feb. 24, 2005    (JP)    ............... 2005-048517

(51) Int. Cl.
*B62D 21/00* (2006.01)
(52) U.S. Cl. ...................... 280/782; 280/784
(58) Field of Classification Search .......... 280/782, 280/784
See application file for complete search history.

(56) References Cited

U.S. PATENT DOCUMENTS

| | | | | | |
|---|---|---|---|---|---|
| 3,848,886 | A | * | 11/1974 | Feustel et al. | 280/784 |
| 3,860,258 | A | * | 1/1975 | Feustel et al. | 180/312 |
| 3,915,486 | A | * | 10/1975 | Maeda et al. | 293/133 |
| 4,031,978 | A | * | 6/1977 | Taylor | 180/232 |
| 4,232,755 | A | * | 11/1980 | Dow | 180/65.6 |
| 5,451,077 | A | * | 9/1995 | Fantauzzo | 280/784 |
| 6,467,836 | B1 | | 10/2002 | Miller et al. | |
| 6,572,162 | B2 | * | 6/2003 | Belloso | 293/132 |
| 6,676,709 | B1 | * | 1/2004 | de la Asuncion | 280/784 |
| 6,942,261 | B2 | * | 9/2005 | Larsen et al. | 293/107 |
| 7,137,472 | B2 | * | 11/2006 | Aoki | 180/274 |
| 7,165,787 | B1 | * | 1/2007 | Go | 280/777 |

FOREIGN PATENT DOCUMENTS

| | | | |
|---|---|---|---|
| DE | 100 40 673 A1 | 2/2002 | |
| DE | 102 47 492 A1 | 4/2004 | |

(Continued)

OTHER PUBLICATIONS

Supplementary European Search Report; Jul. 17, 2008; 7 pages.

*Primary Examiner*—Toan C To
(74) *Attorney, Agent, or Firm*—Keating & Bennett, LLP (57) ABSTRACT

A vehicle body reinforcement device comprises an elongated shape with its middle portion comprising a hydraulic damper that produces a damping force against longitudinal deformation. Two vehicle body reinforcement devices may be mounted in a longitudinal manner to a vehicle body frame with a lateral space being defined between the two devices. Both ends of each of the vehicle body reinforcement devices can be removably attached from outside of the vehicle to positions that are exposed outside of the passenger compartment and below the vehicle body.

18 Claims, 10 Drawing Sheets

FOREIGN PATENT DOCUMENTS

| | | |
|---|---|---|
| EP | 1 209 062 A2 | 5/2002 |
| EP | 1 671 872 A1 | 6/2006 |
| JP | 2003252240 | 9/2003 |
| JP | 2007203896 | 8/2007 |
| WO | WO 2005/077738 A1 | 8/2005 |

\* cited by examiner

DEVICE FOR REINFORCING VEHICLE BODY OF VEHICLE

CROSS-REFERENCE TO RELATED APPLICATIONS

This application is a National Phase application of International Application No. PCT/JP2006/302154, filed Feb. 8, 2006, which claimed priority to Japanese Application No. 2005-048517, filed Feb. 24, 2005, each of which is hereby incorporated by reference in its entirety.

BACKGROUND OF THE INVENTION

1. Field of the Invention

This invention generally relates to a vehicle body reinforcement devices for vehicles. More particularly, the present invention relates to such devices that can improve ride comfort while reducing vibrations generated by reinforcement.

2. Description of the Related Art

Conventionally, there has been a practice of using retrofit reinforcement members, such as the members disclosed in U.S. Pat. No. 5,411,311 (hereinafter simply referred to as Patent Document 1) to increase the strength of the vehicle body frame based upon driving conditions and driver's preference. The reinforcement member disclosed in the Patent Document 1 is formed in an elongated shape and is located in the engine compartment.

This reinforcement member is attached to the upper ends of a pair of right and left suspension towers of the vehicle body frame to interconnect the suspension towers. Therefore, the reinforcement member reinforces the vehicle body against lateral forces applied by the upper ends of front suspension shock absorbers to the vehicle body.

The conventional reinforcement members described above, when compressed under loading and released immediately after loading, might generate vibration and deteriorate ride comfort. In order to reduce the likelihood of the generation of such vibration, occasionally damping force producing means such as a hydraulic damper or a rubber member is interposed in the middle of longitudinal direction as disclosed in JP-A-2002-211437 (hereinafter simply referred to as Patent Document 2).

Further, in order to reduce the likelihood of vibration while reinforcing the vehicle body, configurations such as those disclosed in German Patent DE10247492-A1 (hereinafter simply referred to as Patent Document 3) have been used. Patent Document 3 uses the frame member itself, such as the body shell and frame of the vehicle, to reduce the likelihood of vibration generation. The damping force producing means shown in Patent Document 3 uses two elongated frame members that are interconnected by a gap filled with viscoelasticity plastics.

The frame members that both reinforce and reduce vibration are directed in differing directions on the floor of the passenger compartment. In other words, they are provided so that their longitudinal directions are in: the lateral direction of the vehicle, the oblique direction extending from the right front side to the left rear side of the vehicle body, and the longitudinal direction of the vehicle body.

SUMMARY OF THE INVENTION

However, positioning the reinforcement member in the engine compartment, as shown in Patent Document 1 and Patent Document 2, is made much more difficult due to the space restrictions within the engine compartment. The space for mounting such components is greatly reduced because it already contains the engine, its auxiliary devices, and many other devices. In addition, the hood height further limits the space available within the engine compartment.

Further, the reinforcement member, as it traverses the upper space in the engine compartment, decreases the serviceability of the engine and other devices. While it is conceivable to provide the reinforcement member in the cabin space, employing such a constitution undesirably reduces the cabin space.

The reinforcement member is designed to reinforce the front part of the vehicle body in the lateral direction and does not reinforce the portion of the vehicle body between the front and rear parts of the vehicle body. As a result, the reinforcement member does not restrict elastic deformation in the longitudinal direction of the vehicle body frame that may occur during sudden deceleration of the vehicle. This longitudinal deformation can decrease the ride comfort.

Moreover, because the reinforcement configuration described in Patent Document 3 is integrated into the body shell and frame of the vehicle, that particular reinforcement configuration can be provided only when the vehicle body is manufactured. That is, the reinforcement configuration cannot be attached to or removed from the vehicle body after the manufacture of the vehicle body. Therefore, with the vehicle employing this reinforcement configuration, ride comfort cannot be easily improved based upon the preference of the driver.

Therefore, one object of the invention is to provide a reinforcement device for the vehicle body frame that makes it possible to easily improve ride comfort by attachment or removal of the reinforcement member according to the preference of the driver while not substantially changing the existing vehicle body configuration and not significantly decreasing serviceability or in-cabin comfort.

Thus, the vehicle body reinforcement device preferably is formed in elongated shape and with a force generating means for generating a hydraulic damping force against its longitudinal deformation interposed in its middle. The vehicle body reinforcement device for vehicles preferably is disposed in laterally paired positions on the vehicle body frame with its length put in the longitudinal direction of the vehicle body. Both end parts preferably are detachably attached from outside to parts of the vehicle body frame that are exposed outside the passenger compartment in the lower part of the vehicle body.

As the vehicle body reinforcement device is attached to the vehicle body frame, it appropriately improves longitudinal rigidity of the vehicle body frame and improves ride comfort while restricting vibrations from being generated. The vehicle body reinforcement device may be detachably attached easily from the underside of the vehicle body while lifting the vehicle body with a jack or the like.

The detachable attachment of the vehicle body reinforcement device to the vehicle body can be accommodated simply by providing, for example, attachment seats and attachment brackets to an existing vehicle body.

Therefore, it is possible to provide a vehicle body reinforcement device for vehicles for reinforcing the vehicle body in the longitudinal direction and easily improving ride comfort without making substantial change in the vehicle body configuration of an existing vehicle. Further, because the vehicle body reinforcement device uses the space exposed outside the passenger compartment below the vehicle body, serviceability and passenger compartment comfort are not adversely affected.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENT

An embodiment of a vehicle body reinforcement device for vehicles is described below with reference to the FIGS. 1 to 6. The vehicle body reinforcement device may be used to reinforce the vehicle body of motor vehicles, such as passenger cars, trucks, and buses, for example but without limitation.

Figure 1:
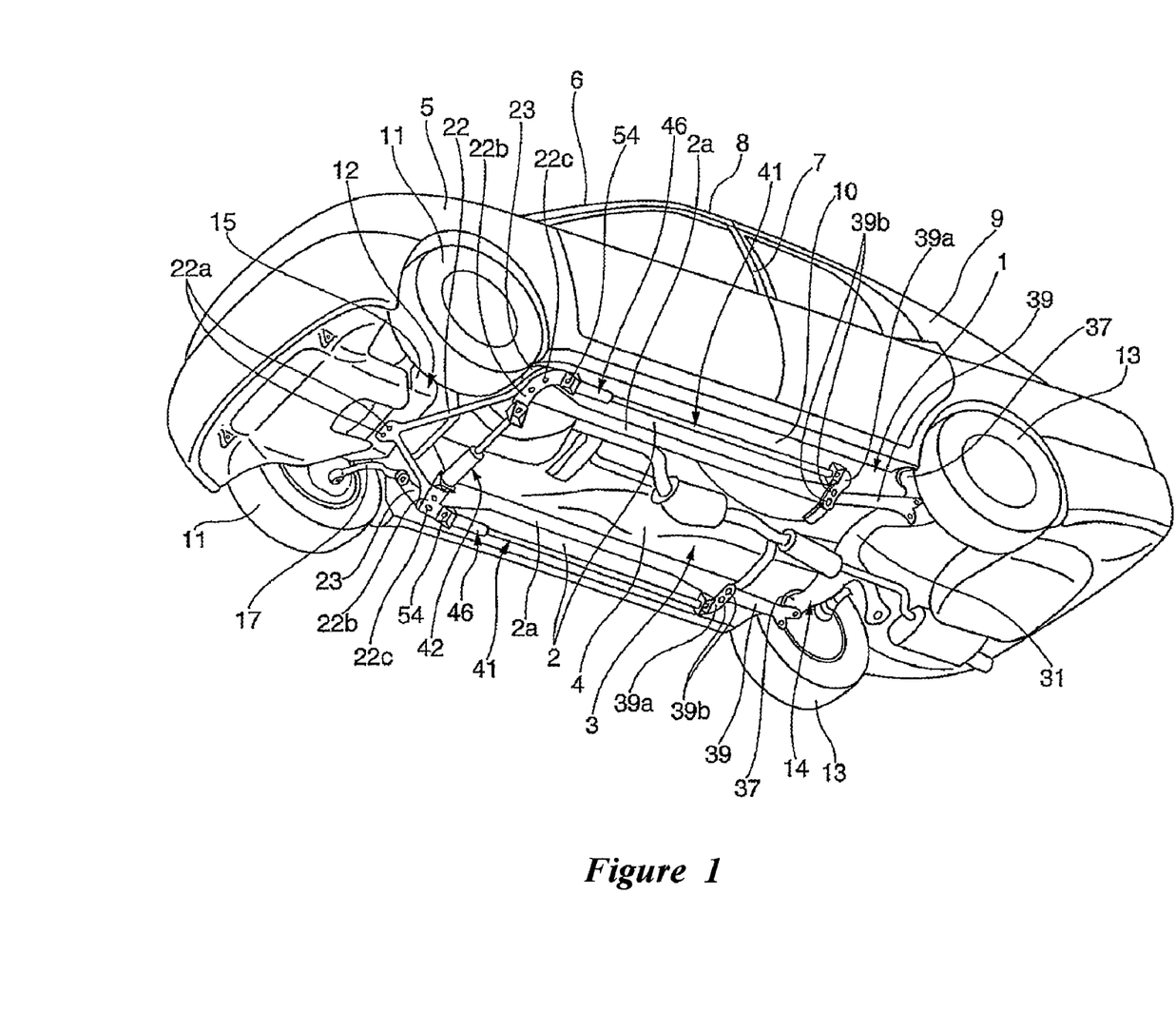
FIG. 1 is a perspective underside view of a vehicle provided with a vehicle body reinforcement device for vehicles that is arranged and configured in accordance with certain features, aspects and advantages of an embodiment of the present invention.

In these figures, the reference numeral 1 denotes a monocoque body as a vehicle body frame for an automobile according to this embodiment. This monocoque body 1, as shown in FIG. 1, includes: right and left side frames 2, 2 that extend in a longitudinal direction on both sides of the vehicle body; a floor panel 4 that defines an underbody 3 together with the side frames 2, 2; front fender aprons 5; front pillars 6; center pillars 7; a roof 8; rear pillars 9; and side sills 10. This monocoque body 1 is fabricated by combining and welding together a plurality of press-formed plate members and pipes. The side frame 2 comprises an integrally formed ridge 2a of a square-cornered U-shaped cross section, which projects downward and extends in the longitudinal direction.

A front wheel suspension system 12 comprising front wheels 11 is provided in the front part of the monocoque body 1 and a rear wheel suspension system 14 comprising rear wheels 13 is provided in the rear part.

Figure 5:
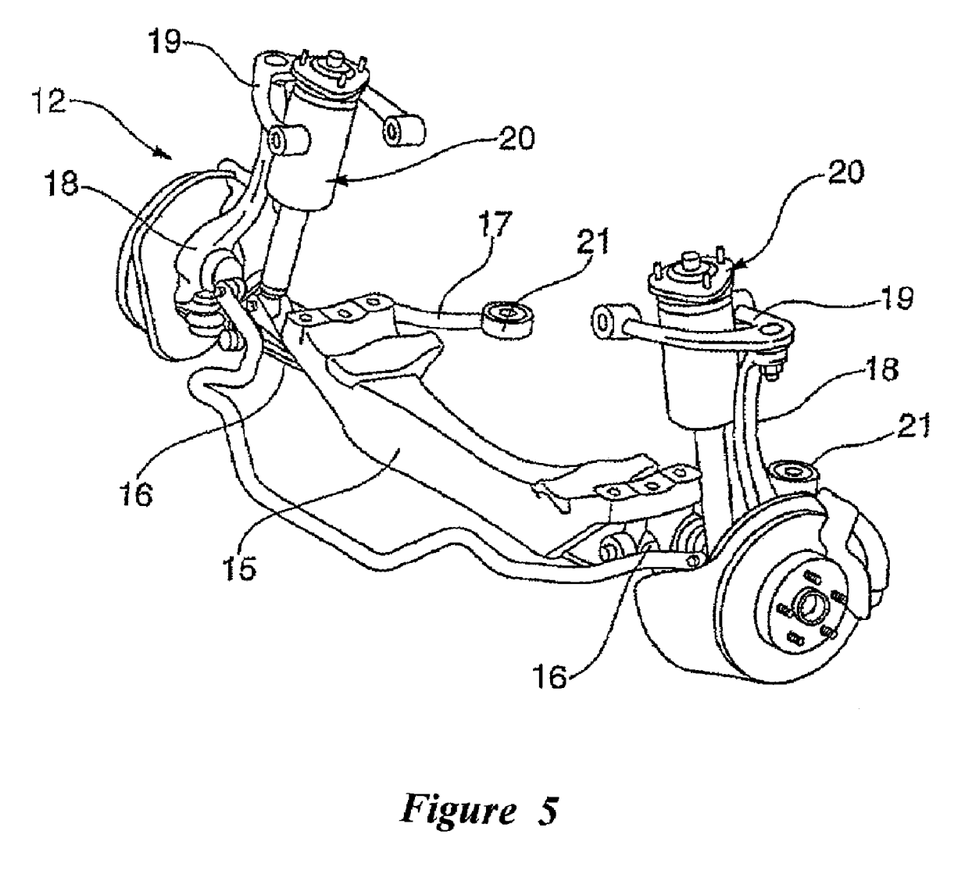
FIG. 5 is a perspective view of a front wheel suspension system.

The front wheel suspension system 12 is of the conventionally well-known double wishbone type, configured as shown in FIG. 5 of: a front suspension member 15, front lower arms 16, rear lower arms 17, knuckles 18, upper arms 19, cushion units 20, etc. The front suspension member 15 is attached to the underside of the underbody 3.

The front lower arm 16 is provided between the front suspension member 15 and a lower end of the knuckle 18. The end of the rear lower arm 17 on the front wheel side pivots relative to the lower end part of the knuckle 18. A connecting member 21 is provided on the vehicle body side end of the rear lower arm 17. The end part of the rear lower arm 17 on the vehicle body side is attached to a floor panel 4 through a front stability brace 22 to be described later (See FIG. 1) that is attached to the underside of the connecting member 21. The connecting member 21 comprises: an outer cylinder welded to the rear lower arm 17, an inner cylinder put in the outer cylinder, and a rubber damper interposed between these cylinders. The inner cylinder is attached to the front stability brace 22.

The front wheel side end of the upper arm 19 pivots relative to the upper end part of the knuckle 18. The vehicle body side end of the upper arm 19 pivots relative to the underbody 3. The cushion unit 20 is interposed between the front lower arm 16 and the underbody 3, which is located above the front lower arm 16.

The front stability brace 22 is formed, as shown from underneath in FIG. 1, in a V-shape with its edge pointing forward. The front end part of the front stability brace 22 is secured using two bolts 22a to the underside center portion of the front suspension member 15. An attachment bracket 22b, which will be described later, is put on the underside of the rear end part (on each side) of the front stability brace 22. The rear end part on each side of the front stability brace 22 and the attachment brace 22b are secured to the raised ridge 2a of the side frame 2 using two more bolts 22c.

The connecting member 21, which is provided at the vehicle body side end of the rear lower arm 17, is supported with a bracket 23. The bracket 23 can be integrated with each of the lateral ends of the front stability brace 22.

Providing the above-described front stability brace 22 on the monocoque body 1 increases the attachment rigidity of the front suspension member 15 and the support rigidity of the rear lower arm 17.

Figure 6:
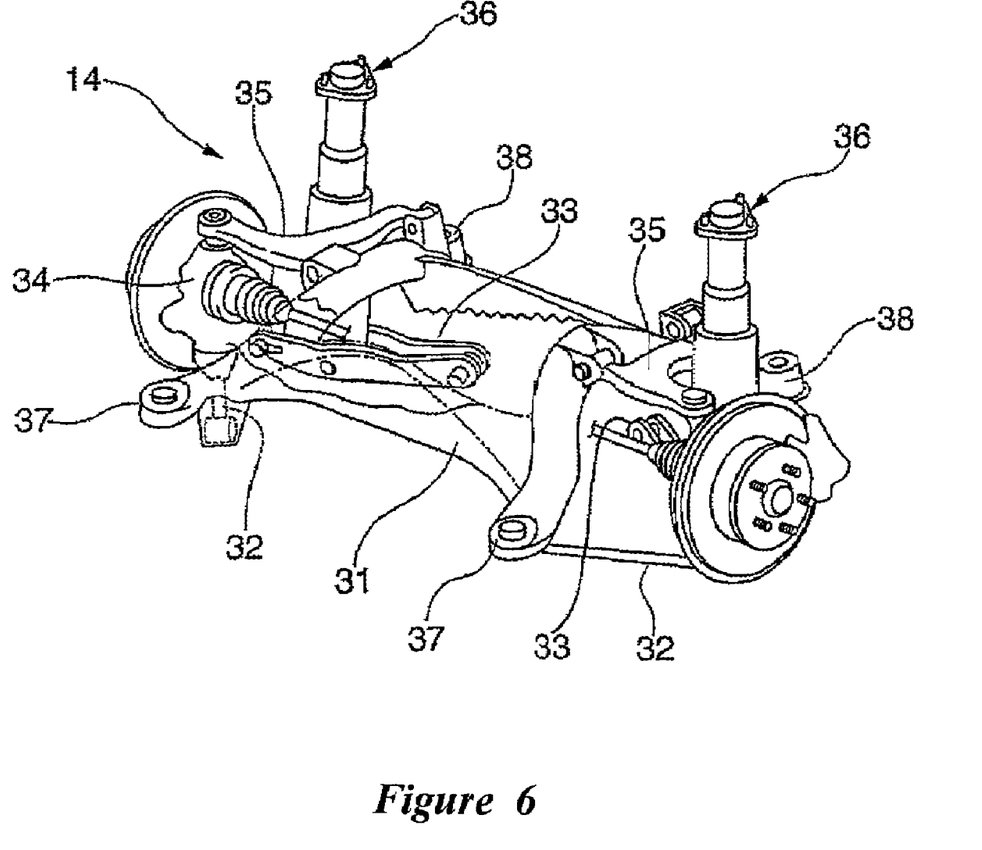
FIG. 6 is a perspective view of a rear wheel suspension system.

The rear wheel suspension system 14 preferably is of the conventionally well-known double wishbone type. With reference to FIG. 6, the rear wheel suspension system 14 comprises: a rear suspension member 31, front lower arms 32, rear lower arms 33, knuckles 34, upper arms 35, rear cushion units 36, etc. The rear suspension member 31 preferably comprises left and right front side attachment parts 37, 37, and left and right rear side attachment parts 38, 38. The rear suspension member can be attached to the underside of the underbody using the attachment parts 37, 38.

Rear stability braces 39 (see FIG. 1), which are described later, can be respectively attached to the underside of the front side attachment parts 37. The rear stability braces 39 interconnect the front side attachment parts 37 and the rear end part of the raised ridges 2a located in front of the front side attachment parts 37 to improve the attachment rigidity of the of the front side attachment parts 37. Attachment brackets 39a, which also are described later, can be attached to the underside of the forward portions of the attachment brackets 39a. Each of the forward portions of the attachment brackets 39a and the attachment bracket 39a is secured to the rear end part of the raised ridge 2a using two fitting bolts 39b.

The front lower arm 32 and the rear lower arm 33 on each side of the rear wheel suspension system 14 is provided between the rear suspension member 31 and the lower portion of the knuckle 34.

The vehicle body side end of the front lower arm 32 pivots in the vicinity of the forward attachment part 37 of the rear suspension member 31.

On the illustrated monocoque body 1, a right and left pair of vehicle body reinforcement devices 41 are detachably provided between lateral ends of the front stability braces 22 and the front ends of the pair of right and left rear stability braces 39. These vehicle body reinforcement devices 41 can be disposed in laterally paired positions on the monocoque body generally below the floor panel 4 of the monocoque body and outside of the passenger compartment.

Figure 4:
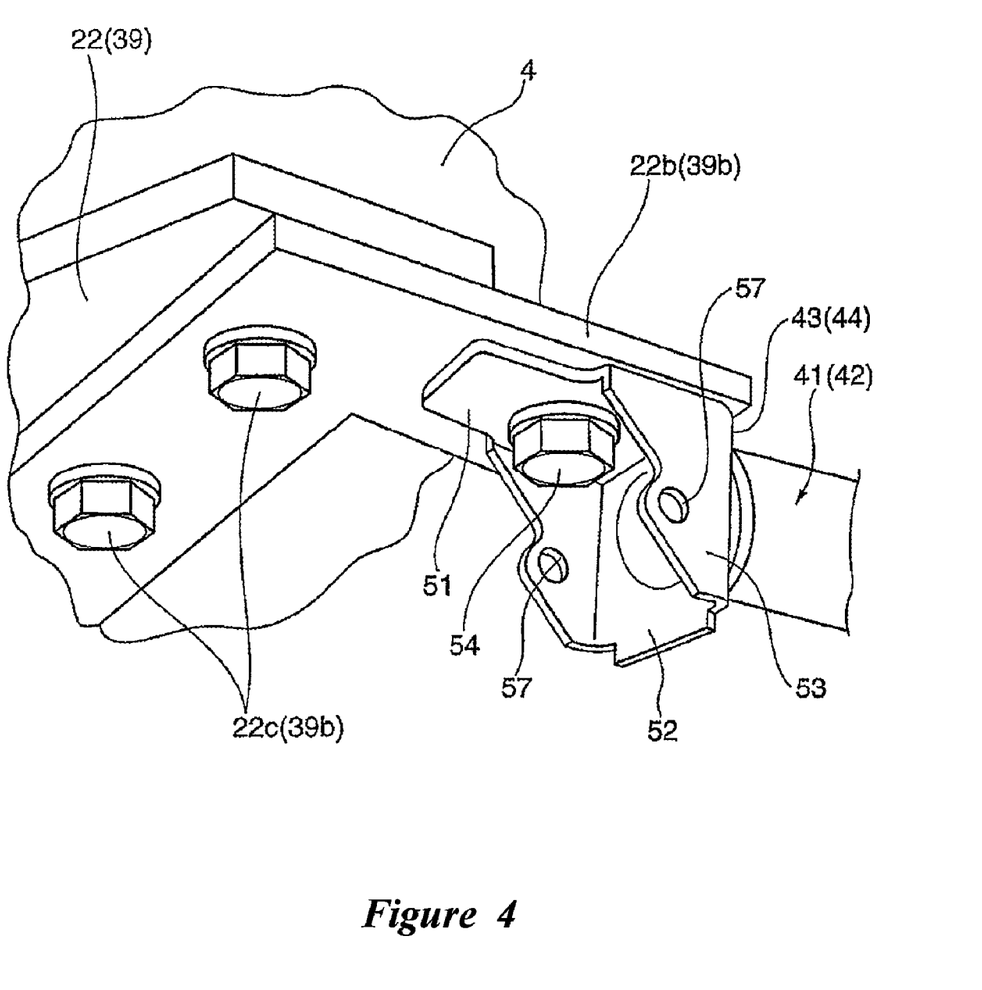
FIG. 4 is a perspective view of the front end part of the vehicle body reinforcement device of FIG. 1 attached to a front stability brace.

The forward portion of the vehicle body reinforcement device 41 is attached to the lateral end of the front stability brace 22 through the attachment bracket 22b. In other words, as shown in FIG. 4, the forward portion of the vehicle body reinforcement device 41 is attached to the attachment bracket 22b, which is secured to the underbody 3 together with the front stability brace 22. Also, the forward portion of the vehicle body reinforcement device 41 is removably connected to an underside of the attachment bracket 22b. The attachment bracket 22b extends from the portion that is secured to the front stability brace 22 longitudinally to the rear and laterally to the inside. The forward portion of the vehicle body reinforcement device 41 preferably is attached to the end portion of the longitudinally extending portion of the attachment bracket 22b.

The rear portion of the vehicle body reinforcement device 41 preferably is attached to the forward portion of the rear stability brace 39 through the attachment bracket 39a. In other words, the rear portion of the vehicle body reinforcement device 41 is attached to the attachment bracket 39a, which is secured to the underbody 3 together with the rear stability brace 39 of the attachment bracket 39a. The rear portion of the vehicle body reinforcement device 41 preferably is removably connected from below to the attachment bracket 39a. The attachment bracket 39a extends laterally from the position where it is secured to the underbody 3 together with the rear stability brace 39. The rear portion of the vehicle body reinforcement device 41 is attached to the laterally extending portion of the vehicle body.

Preferably, each of the vehicle body reinforcement devices 41 comprises an elongated shape with its length extending in the longitudinal direction of the vehicle body and spanning the distance between the rear portion of the front stability brace 22 and the forward portion of the rear stability brace 39. The vehicle body reinforcement devices 41 can be placed generally parallel to each other. More preferably, the vehicle body reinforcement devices 41 are positioned along the raised ridges 2a of the side frames 2, which can define longitudinal extension parts. Even more preferably, each of the vehicle body reinforcement devices 41 can be placed as shown in FIG. 1 within the wheelbase of the vehicle body and having a length equal to or greater than one half of the wheelbase.

In the illustrated embodiment, a vehicle body reinforcement device 42, which is configured generally the same as the vehicle body reinforcement device 41 only shorter in length, is interposed in a lateral direction of the vehicle between the laterally extending portions of the front stability brace 22. The vehicle body reinforcement device 42 is detachably attached from below to the vehicle body inner side ends of the attachment brackets 22b provided on both ends of the front stability brace 22. Therefore, the vehicle body reinforcement device 42 is removably attached from underneath, outside of the passenger compartment and under the monocoque body 1 of the vehicle.

Figure 2:
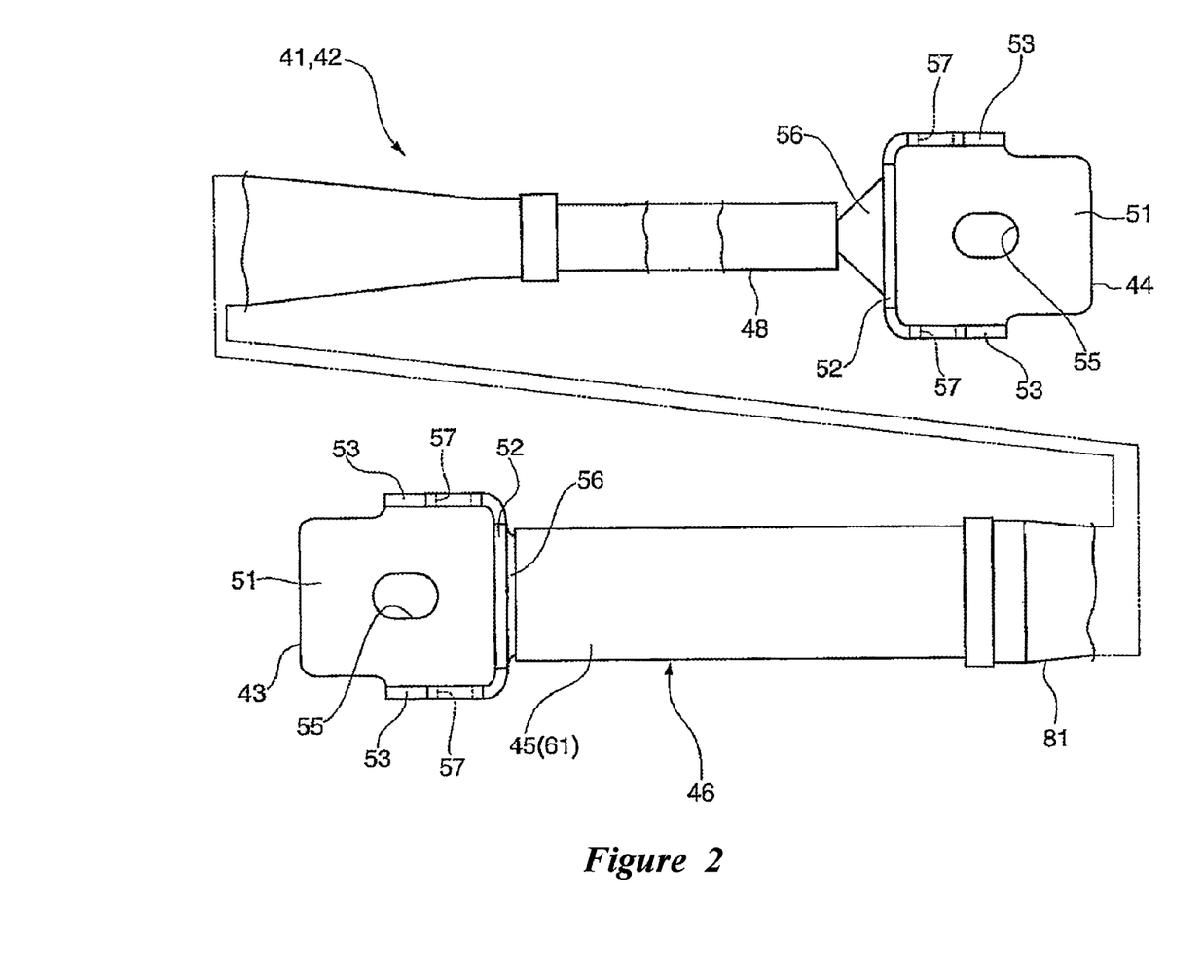
FIG. 2 is a plan view of the vehicle body reinforcement device of FIG. 1.
Figure 3:
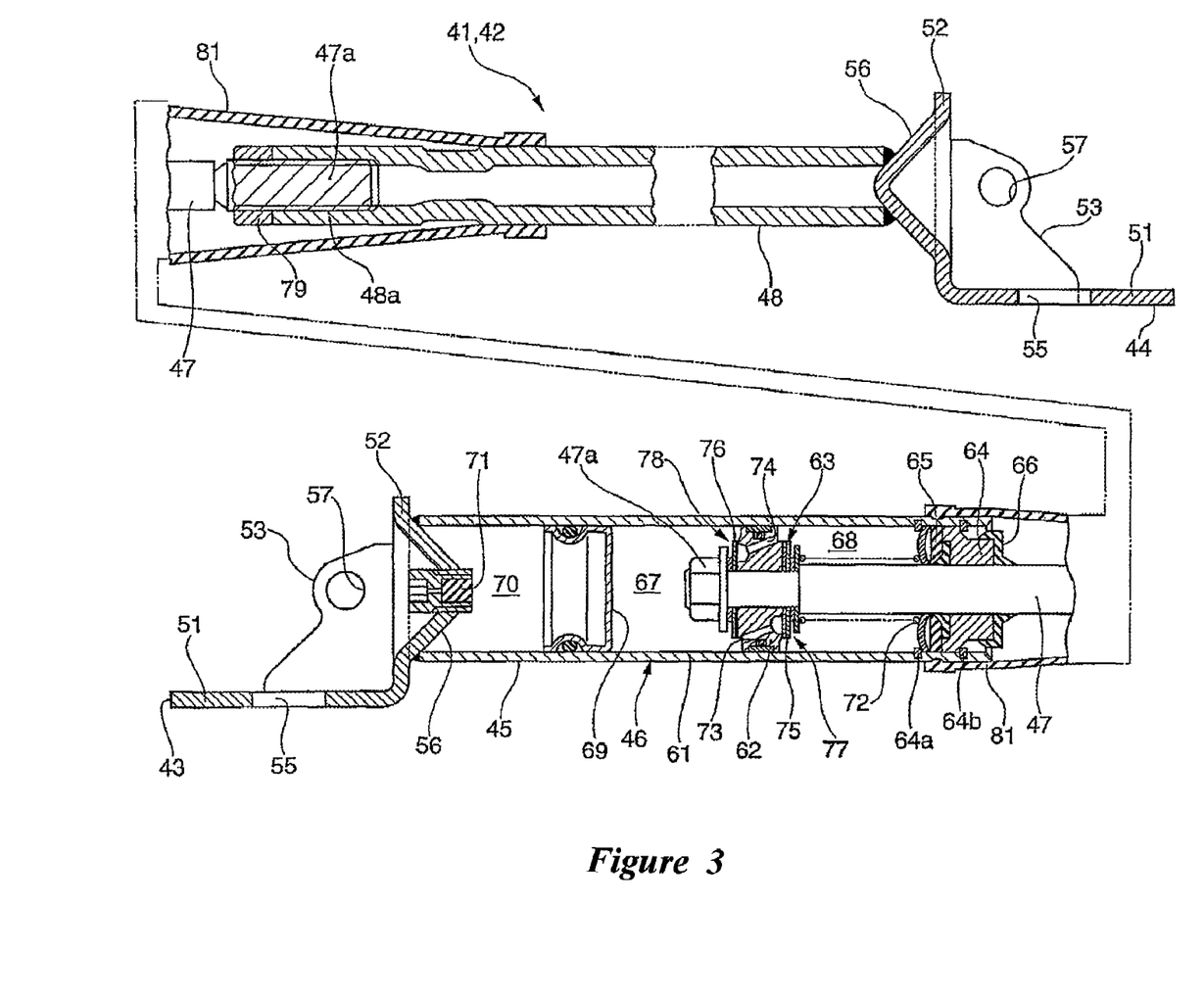
FIG. 3 is a vertical sectional view of the vehicle body reinforcement device of FIG. 1.

The longitudinally extending vehicle body reinforcement device 41 and the laterally extending vehicle body reinforcement device 42, as shown in FIGS. 2 and 3, each comprise: attachment members 43, 44 that are provided at both ends for attachment to the vehicle body, a hydraulic damper 46 having a hydraulic cylinder 45 welded to one 43 of the attachment members 43, 44, and an extension rod 48 interconnecting the piston rod 47 of the hydraulic damper 46 and the other attachment member 44.

The attachment members 43, 44 each can be formed from steel sheets that are press-processed into a specified shape. The attachment members 43,44 preferably comprise: an attachment plate 51 that can be attached to the vehicle, a supporting plate 52 that rises from one end of the attachment plate 51, and a pair of reinforcement ribs 53 that interconnect the sides of the two plates.

In the illustrated attachment plate 51 shown in FIG. 2, an elongated hole 55 is formed to accommodate a fitting bolt 54 (see FIG. 1), which is used to attach the attachment members 43, 44 to the vehicle. The fitting bolt 54, which is shown in FIG. 4, secures the attachment plate 51 to the attachment bracket 22b (39b), which is secured to the floor panel 4 along with the front stability brace 22 or the rear stability brace 39. The elongated hole 55 preferably is elongated in lateral direction in FIG. 2 such that the axis of elongation will be at a right angle to the main surface of the supporting plate 52.

The attachment members 43, 44 are attached with the main surface of the supporting plate 52 being generally orthogonal to the longitudinal direction of the vehicle body reinforcement devices 41, 42. Therefore, the positions at which the attachment members 43, 44 are attached may be adjusted in the longitudinal direction with respect to the attachment bolt 54 by the displacement margin provided by the elongated hole 55.

The supporting plate 52 can be provided with a conical part 56 in its center. The conical part 56 can be formed by pressing out a central portion of the supporting plate 52 in the direction that will be away from the attachment plate 51. This conical part 56 can be used when the supporting plate 52 is welded to the extension rod 48. Holes 57 for attaching a damping force measuring device can be bored in the reinforcement ribs 53.

The hydraulic damper 46 as shown in FIG. 3 comprises: the hydraulic cylinder 45 having a cylinder tube 61 with one end closed by the attachment member 43, and a throttle 63 that is provided in the piston 62 of the hydraulic cylinder 45. The hydraulic damping force generating means can comprise the hydraulic damper 46.

At one end of the cylinder tube 61, the conical part 56 of one attachment member 43 can be inserted into the cylinder tube 61 and welded thereto. The welding can be carried out by any suitable method. In one method, the conical part 56 is fit in the opening of the cylinder tube 61 so that both components come into a line contact with each other and then the welding takes place. Inserting and fitting the conical part 56 into the cylinder tube 61 as described above results in that, even if the end edge of the cylinder tube 61 were formed aslant, the welding-use conical part 56 and the cylinder tube 61 come into line contact with each other in the state of being on approximately the same axial line. That is, in comparison with the case in which seam welding is made with the open end of the cylinder tube 61 abutting on a flat plate for closure, it is possible to facilitate manufacture of the cylinder tube 61, reduce costs, and improve appearance. Projection welding is performed with the conical part 56 and the cylinder tube 61 combined together as described above, and applying a high tension current to them while pressing them against each other in the axial direction.

The other end of the cylinder tube 61 can be closed with a rod guide 64 that moveably supports the piston rod 47. The rod guide 64 can be inserted into and secured to the cylinder tube 61 with stop rings 64a, 64b or the like. At both axial ends of the rod guide 64, seal members 65, 66 are provided for sealing the part of it where the piston rod 47 passes through.

The piston 62 is formed circular in cross section for fitting in the cylinder tube 61 and defines a first oil chamber 67 and a second oil chamber 68 within the cylinder tube 61. The piston 62 can be secured to the portion of the piston rod 47 that passes through the piston 62 using a fitting nut 47a, for instance.

The first oil chamber 67 is formed between the piston 62 and the free piston 69, which is moveably positioned within the cylinder tube 61. The free piston 69 defines the first oil chamber 67 and a high pressure gas chamber 70 in one end part of the cylinder tube 61. The high pressure gas chamber 70 is filled with high-pressure $N_2$ gas. A port, which can be closed by the screw 71, with a seal rubber can be formed in the conical part 56 of one of the attachment members 43. The attachment member forms one of the walls of the high pressure gas chamber 70. The port is used for filling the high pressure gas chamber 70 with high pressure $N_2$ gas.

The piston 62 is urged in the compressing direction of the hydraulic cylinder 45 with a compression coil spring 72 that is installed between the piston 62 and the rod guide 64. The compression coil spring 72 offsets the gas reaction force applied from the working oil in the cylinder tube 61 to the piston 62. The gas reaction force results from the fact that the pressure receiving area on the side of the second oil chamber 68 of the piston 62 is smaller than the pressure receiving area on the side of the first oil chamber 67. In other words, as the working oil in the first and second oil chambers 67, 68 is pressed with the high pressure $N_2$ gas, the piston 62 receives a gas reaction force from the working oil corresponding to the difference in the pressure receiving area. The piston 62 is urged with the gas reaction force in the extending direction of the hydraulic cylinder 45. The hydraulic damper 46 of this embodiment comes to its free length as the gas reaction force offsets or balances with the resilient force of the compression coil spring 72. The $N_2$ gas pressure of the hydraulic damper 46 is adjusted so that the free length becomes equal to the length for attachment to the vehicle body.

Making the free length equal to the length for attachment to the vehicle body in this way makes the initial load zero when attached to the vehicle body, the reinforcement devices 41, 42 contract with good response even when very small forces are applied, and produce damping force.

The throttle 63 provided in the piston 62 preferably is similar to those used in suspension system-use shock absorbers, etc. The throttle 63 comprises first and second check valves 77, 78 that have plate springs 75, 76 for opening and closing the opening formed at the ends of communication holes 73, 74 bored in the piston 62. The plate springs 75, 76 are annular shape, are stacked in a plural number, with their inside circumferences generally corresponding to that of the piston 62. The first check valve 77 produces damping force when working oil flows against resilient force of the plate spring 75 in one direction from the first oil chamber 67 to the second oil chamber 68. The second check valve 78 produces damping force when working oil flows against resilient force of the plate spring 76 in one direction from the second oil chamber 68 to the first oil chamber 67.

The extension rod 48 interconnecting the piston rod 47 and the other attachment member 44 preferably is made of pipe, with one end screwed or otherwise connected to the piston rod 47 and the other end welded to the other attachment member 44, for instance.

The connection between the extension rod 48 and the piston rod 47 preferably is configured with a male thread 47a that is formed on the piston rod 47. The male thread 47a can be screwed into a female thread 48a on the extension rod 48 and the extension rod 48 and the piston rod 47 can be secured together with a locking nut 79. Such a configuration makes it possible to adjust the free lengths of the reinforcement devices 41, 42, which may vary due to variations in the $N_2$ gas pressure.

The threaded part, as shown in FIG. 3, can be covered with a rubber boot or sheath 81. The sheath 81 extends over a portion of the extension rod 48 and the cylinder tube 61. The rubber sheath 81 reduces the likelihood of mud, water and dust adhering to the piston rod 47. The rubber sheath 81 is formed in a conical shape with one end secured to the outside surface of the cylinder tube 61 and with the other end secured to the outside surface of the extension rod 48.

Welding the extension rod 48 to the other attachment member 44 can be performed using projection welding in the same way as the attachment member 43 is welded to the cylinder tube 61. In other words, the fore-end of the welding-use conical part 56 of the other attachment member 44 is positioned inside the extension rod 48 to bring them into line contact with each other. Then, both components are pressed together and electric current is applied through them. Welding in this manner makes it possible to easily position the extension rod 48 and the welding-use conical part 56 on the same axial line.

Attachment of the reinforcement devices 41, 42 to the front stability brace 22 and the rear stability brace 39 can be performed, for example, as shown in FIG. 4 with the attachment plates 51 of the attachment member 43, 44 in upper position. In other words, to make this attachment, the attachment plate 51 is placed under on the underside of the attachment brackets 22b, 39a of the front stability brace 22 or the rear stability brace 39. A fitting bolt 54 is tightened into the brackets 22b, 39a. The reinforcement devices 41, 42 may be easily removed from the vehicle body by loosening the fitting bolt 54 followed by removing the attachment members 43, 44 from the attachment brackets 22b, 39a.

As shown with this embodiment, providing the vehicle body reinforcement device 41 between the front stability brace 22 and the rear stability brace 39 makes it possible to improve rigidity in the longitudinal direction of the monocoque body 1. Therefore, ride comfort is different between a vehicle with the vehicle body reinforcement device 41 extending in the longitudinal direction attached and a vehicle with the vehicle body reinforcement device 41 removed.

Further, providing the vehicle body reinforcement device 42 between the lateral ends of the front stability brace 22 makes it possible to improve lateral rigidity in the front part of the monocoque body 1 with the vehicle body reinforcement device 42.

The above-described vehicle body reinforcement device 41 may be easily attached under, or removed from under, the fully-assembled vehicle body (i.e., one in which the front and rear suspension systems 12, 14 and other components have been mounted on the monocoque body 1) while lifting the vehicle body, for example, with a jack. Incidentally, vehicles occasionally may be provided with an undercover (not shown) for covering from under the underbody 3. In such a case, the attachment and removal work is made with the undercover removed and the vehicle body reinforcement devices 41, 42 exposed.

The detachable attachment of the vehicle body reinforcement device 41 to the front stability brace 22 and to the rear stability brace 39 as described above may be realized by simply attaching the attachment brackets 22b, 39a to the front stability braces 22 and the rear stability braces 39 using fitting bolts 22c, 39b. Therefore, the vehicle body reinforcement devices 41, 42 make it possible to appropriately increase the rigidity of the monocoque body 1 in the lateral and longitudinal directions and to improve ride comfort without largely changing the vehicle body configuration of existing vehicles while also restricting vibration generation.

Because the vehicle body reinforcement devices 41, 42 use space exposed below the vehicle body and positioned outside the passenger compartment, ease of service and comfort in the passenger compartment are not impaired. Moreover, the vehicle body reinforcement devices 41, 42 may extend in the longitudinal direction of the vehicle body such that they use an elongated space below the floor panel 4.

Because the vehicle body reinforcement device 41 is formed longer than half of the wheelbase, it is possible to interconnect forward and rearward portions of the vehicle body that are widely separated from each other and to efficiently provide reinforcement against longitudinal deformation while reducing vibration generation.

Because the vehicle body reinforcement device 41 is provided along the raised ridge 2a of the side frame 2, it does not project downward from the monocoque body 1 to a large degree. Therefore, the illustrated configuration makes it possible to make a vehicle compact in spite of being provided with the vehicle body reinforcement device 41.

The illustrated vehicle body reinforcement device 41 is attached to the monocoque body 1 having front stability braces 22 and rear stability braces 39. Therefore, in the illustrated configuration, it is possible to further improve the rigidity of the monocoque body 1 over that being provided with the front stability braces 22 and the rear stability braces 39, while also reducing vibration generation.

While the illustrated embodiment is an example in which the vehicle body reinforcement devices 41 extend in the longitudinal direction of the vehicle body and the vehicle body reinforcement devices 42 extend in the lateral direction, it is possible to improve the ride comfort of the vehicle by providing only the vehicle body reinforcement devices 41 that extend in the longitudinal direction. Providing the vehicle body reinforcement devices 42 that extend in the lateral direction makes it possible to improve the lateral rigidity with the vehicle body reinforcement devices 42 while reducing vibration generation.

Figure 7:
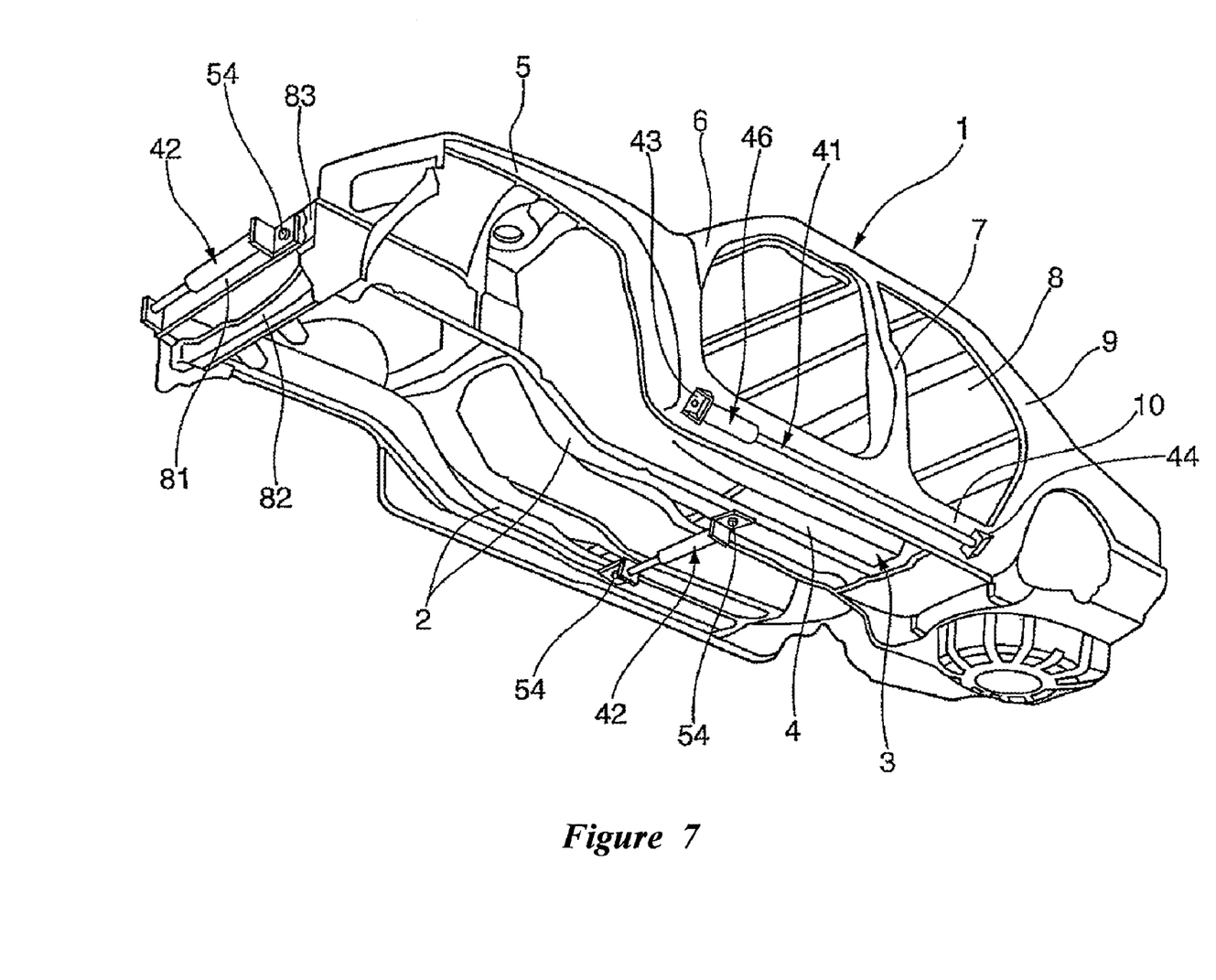
FIG. 7 is a perspective view of a monocoque body with a vehicle body reinforcement device provided on the outer side of a side sill.

With reference now to FIG. 7, a perspective view of the monocoque body with the vehicle body reinforcement device attached to the outer side of the side sill is illustrated. In the figure, components the same as or similar to those described in reference to FIGS. 1 through 6 are provided with the same reference numerals and symbols, and their detailed descriptions will not be repeated.

The vehicle body reinforcement device 41 is configured the same as the one described above and one of the devices 41 is removably attached along the right and left side sills 10 of the monocoque body 1. While only the vehicle body reinforcement device 41 located on the left side of the vehicle body is depicted in FIG. 7, another vehicle body reinforcement device 41 preferably is removably attached to the side sill 10 on the right side of the vehicle body.

Motor vehicles occasionally may be provided with an external cover (not shown) covering the side sill 10 from the outside. In such a case, it is preferable to place the vehicle body reinforcement device 41 behind the external cover so that the appearance of the vehicle is not adversely affected. To employ such a configuration, the external cover is removably attached to the monocoque body 1 so that the vehicle body reinforcement device 41 may be attached to and removed from the side sill 10 when the external cover is removed.

The monocoque body 1 can be provided with a bumper reinforcement 81 and a front cross member 82 that extends laterally at the forward ends of right and left side frames 2, 2.

The bumper reinforcement 81 can be attached to attachment seats 83 connected to the forward portions of the side frames 2, 2 together with the vehicle body reinforcement device 42, which extends laterally across at least a portion of the vehicle. In other words, the vehicle body reinforcement device 42 can be attached with its length directed in the vehicle width direction to two positions on this monocoque body 1 (e.g., one on the bumper reinforcement 81 and the other between the pair of right and left raised ridges 2a of the side frames 2, 2).

As shown with this embodiment, positioning the vehicle body reinforcement device 41 outside the side sill 10 makes it possible to lengthen the vehicle body reinforcement device 41 in the longitudinal direction of the vehicle body because it uses the enlarged space disposed outside of the side sill 10. Therefore, this embodiment makes it possible to efficiently reinforce against longitudinal deformation while reducing vibration generation.

Further, the vehicle body reinforcement device 41 does not project largely outward from the side sill 10 because it is provided along the side sill 10. Therefore, employing this embodiment makes it possible to have a compact vehicle construction in spite of including the vehicle body reinforcement device 41.

With this embodiment, the vehicle body reinforcement device 42, which extends laterally, is attached in two positions, one on the bumper reinforcement 81 and the other between a pair of right and left raised ridges 2a of the side frames 2, 2. Therefore, this embodiment makes it possible to improve the rigidity in the lateral direction of the vehicle while reducing vibration generation.

Figure 8:
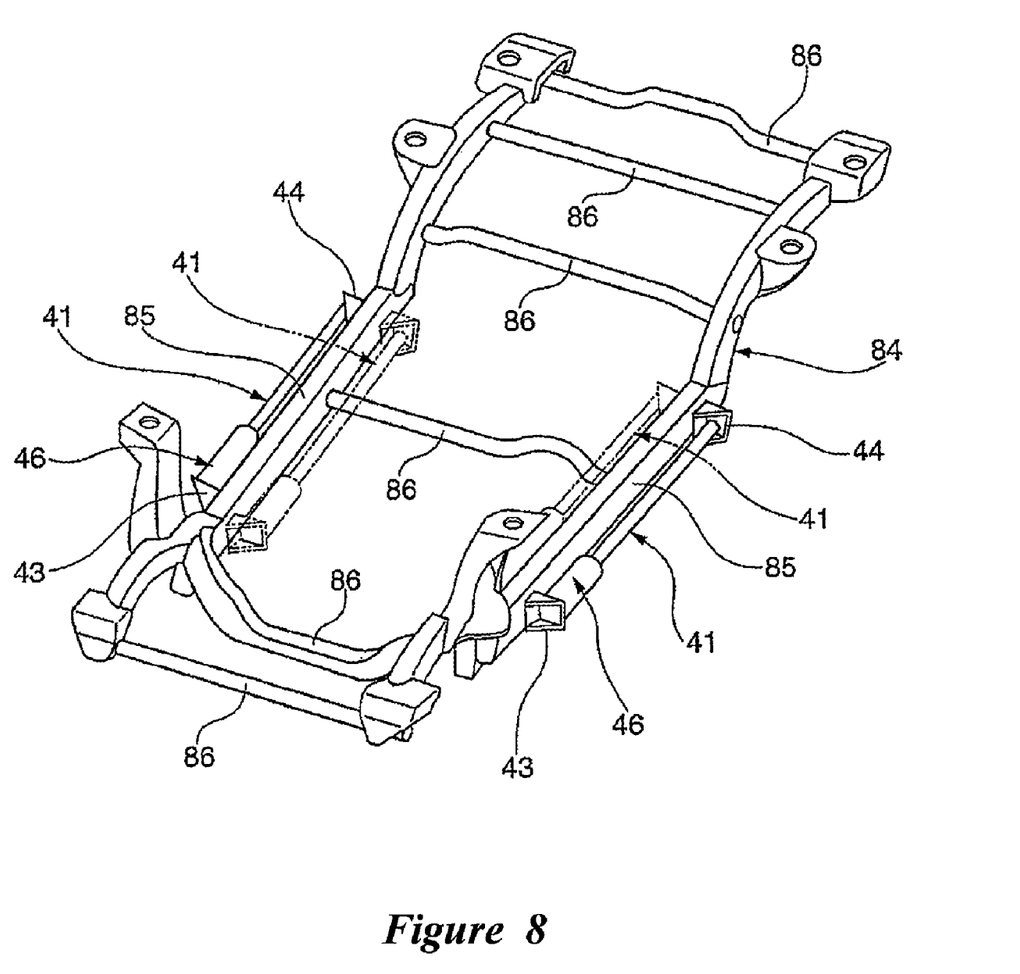
FIG. 8 is a perspective view of a ladder-shaped vehicle body frame provided with a vehicle body reinforcement device.

In some configurations, the vehicle body reinforcement device may be attached to a ladder-shaped vehicle body frame. FIG. 8 is a perspective view of a ladder-shaped vehicle body frame that is provided with one or more of the vehicle body reinforcement devices. In the figure, components the same as or similar to those described in reference to FIGS. 1 through 6 are provided with the same reference numerals and symbols, and their detailed descriptions will not be repeated.

The vehicle body frame 84 shown in FIG. 8 is of a ladder shape conventionally well-known, which comprises: a pair of side frames 85, 85 that extend in the longitudinal direction on both lateral ends of the vehicle body and a plurality of cross members 86 that laterally span the distance between the side frames 85, 85.

The vehicle body reinforcement device 41 generally is constructed the same as the ones described above and is detachably attached to the outside faces of the illustrated side frames 85, 85 such that the vehicle body reinforcement devices 1 extend in the longitudinal direction. When attaching the vehicle body reinforcement device 41, the vehicle body reinforcement device 41 may be removably attached to the inside face of the side frame 85 as shown in chain double-dashed lines in FIG. 8. Further, although not shown, the vehicle body reinforcement device 41 may also be attached to the underside of the side frames 85, 85.

As already mentioned, motor vehicles are occasionally provided with an external cover (not shown) covering the side frames 85, 85 from outside. In such a case, it is preferable to place the vehicle body reinforcement device 41 inside the external cover so that appearance of the vehicle is not adversely affected. To employ such a construction, the external cover is removably attached to the ladder-shaped vehicle body frame 84 so that the vehicle body reinforcement device 41 may be attached to and removed from the side frames 85, 85.

In this way, employing a constitution in which the vehicle body reinforcement device 41 is placed outside the side frames 85, 85 makes it possible to lengthen the vehicle body reinforcement device 41 in the longitudinal direction of the vehicle body such that it uses a large longitudinal space outside the side frames 85,85. Therefore, this embodiment makes it possible to efficiently reinforce against longitudinal deformation while reducing vibration generation.

Further, the vehicle body reinforcement device 41 does not project outward to a large degree from the side frames 85, 85 because it is provided along the side frames 85, 85. Therefore, the illustrated configuration makes it possible to have a compact vehicle construction in spite of being provided with the vehicle body reinforcement device 41.

Although not shown, the lateral vehicle body reinforcement device 42, with its length directed in the vehicle width direction, may be attached between a pair of side frames 85, 85 of the ladder-shaped vehicle body frame 84 or the like. Providing the laterally extending vehicle body reinforcement device 42 in such a manner makes it possible to improve the lateral rigidity of the vehicle body while reducing vibration generation.

Figure 9:
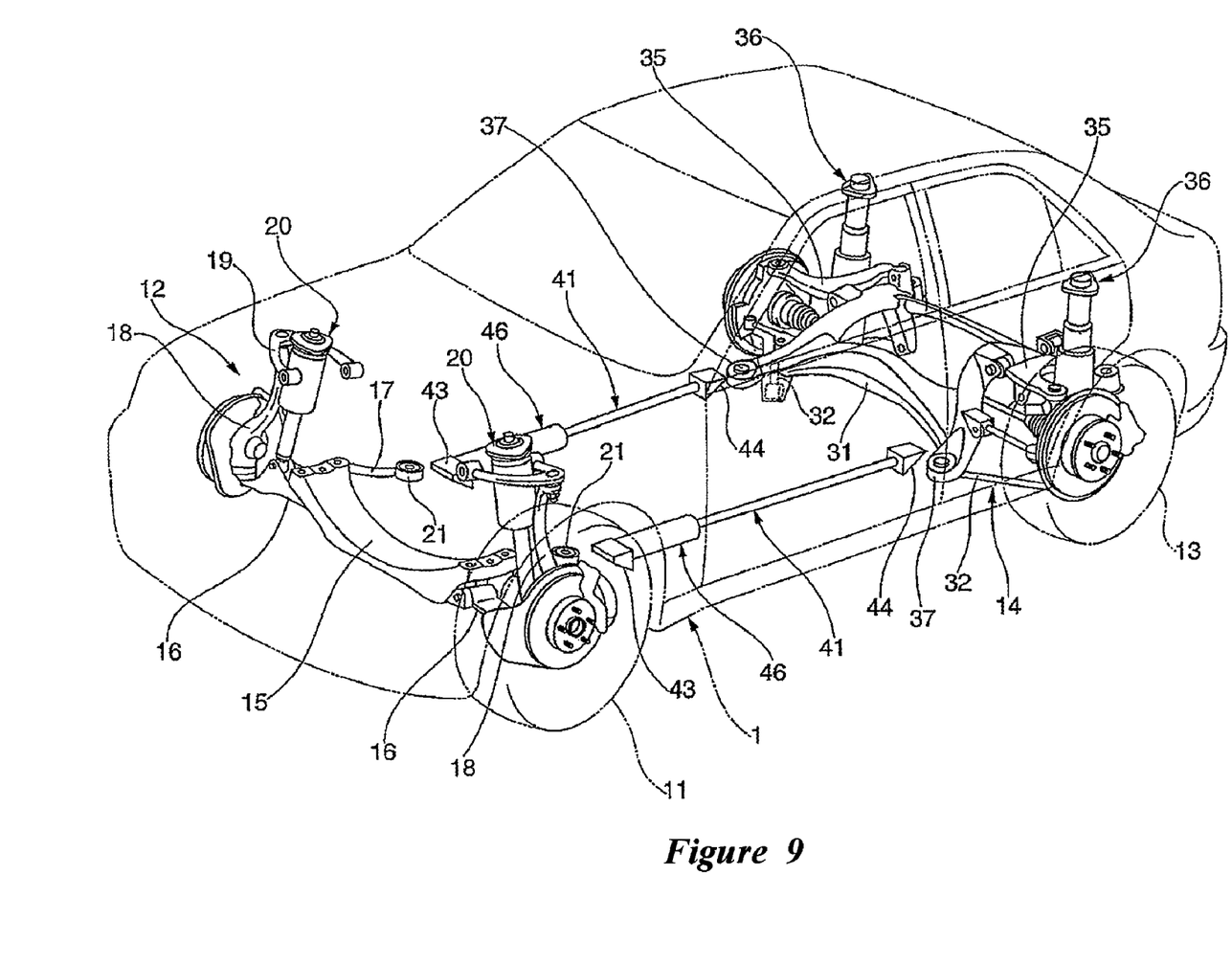
FIG. 9 is a perspective view of another attachment example of a vehicle body reinforcement device.

In some configurations, the vehicle body reinforcement device may be provided between the front wheel suspension system and the rear wheel suspension system. FIG. 9 is a perspective view of such a construction. In the figure, components the same as or similar to those described in reference to FIGS. 1 through 6 are provided with the same reference numerals and symbols, and their detailed descriptions will not be repeated.

The end portion (e.g., the connecting member 21) on the vehicle body side of the rear lower arm of the front wheel suspension system 12 (shown in FIG. 9) can be directly supported with the underside of the floor panel 4 (not shown) of the monocoque body 1. The front attachment part 37 of the rear wheel suspension system 14 can be attached in one position to the underside of the floor panel 4. That is, unlike the first embodiment, the front and rear wheel suspension systems 12, 14 according to this embodiment are not provided with the front stability brace 22 and the rear stability braces 39.

The vehicle body reinforcement device 41 of FIG. 9 preferably has the same configuration as that of FIG. 1 and the vehicle body reinforcement device preferably is removably attached to the underside of the floor panel 4 in a longitudinally-extending manner between the front wheel suspension system 12 and the rear wheel suspension system 14. In other words, the forward portion (e.g., the attachment member 43) of the reinforcement device 41 is removably attached to a portion of the floor panel 4 in the vicinity of the portion (e.g., the connecting member 21 of the rear lower arm 17) that attaches the front wheel suspension system 12 to the vehicle body frame (e.g., the monocoque body 1).

The rearward portion (e.g., the attachment member 44) of the reinforcement device 41 can be removably attached to portion of the floor panel 4 in the vicinity of the portion (e.g., the front attachment part 37 of the rear suspension member 31) that attaches the rear wheel suspension system 14 to the vehicle body frame (monocoque body 1). The reinforcement devices 41 preferably are provided, like the first embodiment, as a pair in the lateral direction, generally parallel to each other, along the floor panel 4.

Thus, rigidity is appropriately improved with the vehicle body reinforcement device 41, while reducing vibration generation, between part of the floor panel 4 around the area to which longitudinal pressing force is applied from the rear lower arm 17 of the front wheel suspension system 12 and part of the floor panel 4 around the area to which longitudinal pressing force is applied from the front attachment part 37 of the rear wheel suspension system 14.

Other configurations also can be used where the vehicle body reinforcement device 41 is spanned between part of the vehicle body frame where the front wheel suspension system 12 is attached and part of the vehicle body frame where the rear wheel suspension system 14 is attached, as shown. For example, the front end part (e.g., the attachment part 43) of the vehicle body reinforcement device 41 may be formed integrally with the inner cylinder of the connecting member 21 of the rear lower arm 17 of the front wheel suspension system 12 and attached together with it to the floor panel 4. Likewise, the rear end part of the vehicle body reinforcement device 41 may be formed integrally with the front attachment part 37 of the rear wheel suspension system 14 or with the front end part, adjacent to the front attachment part 37, of the rear suspension member 31 and attached together with it to the floor panel 4.

The front end part (attachment member 43) of the vehicle body reinforcement device 41 may be attached together with the inner cylinder of the connecting member 21 to the attachment seat (not shown) of the floor panel 4 to which the connecting member 21 is attached. The rear end part (attachment member 44) of the vehicle body reinforcement device 41 may be attached together with the front attachment part 37 to the attachment seat (not shown) of the floor panel 4 to which the front attachment part 37 is attached. In this case, the front end part of the vehicle body reinforcement device 41 may be attached by coupling it and the inner cylinder of the connecting member 21 to the floor panel 4, and the rear end part of the vehicle body reinforcement device 41 may be attached by coupling it with the front attachment part 37 to the floor panel 4. When attaching the vehicle body reinforcement device 41 to the vehicle body frame, utilizing in this way the attachment seat for the front wheel suspension system and the attachment seat for the rear wheel suspension system makes the attachment easier and more economical in comparison with providing dedicated attachment seats on the vehicle body frame.

Figure 10:
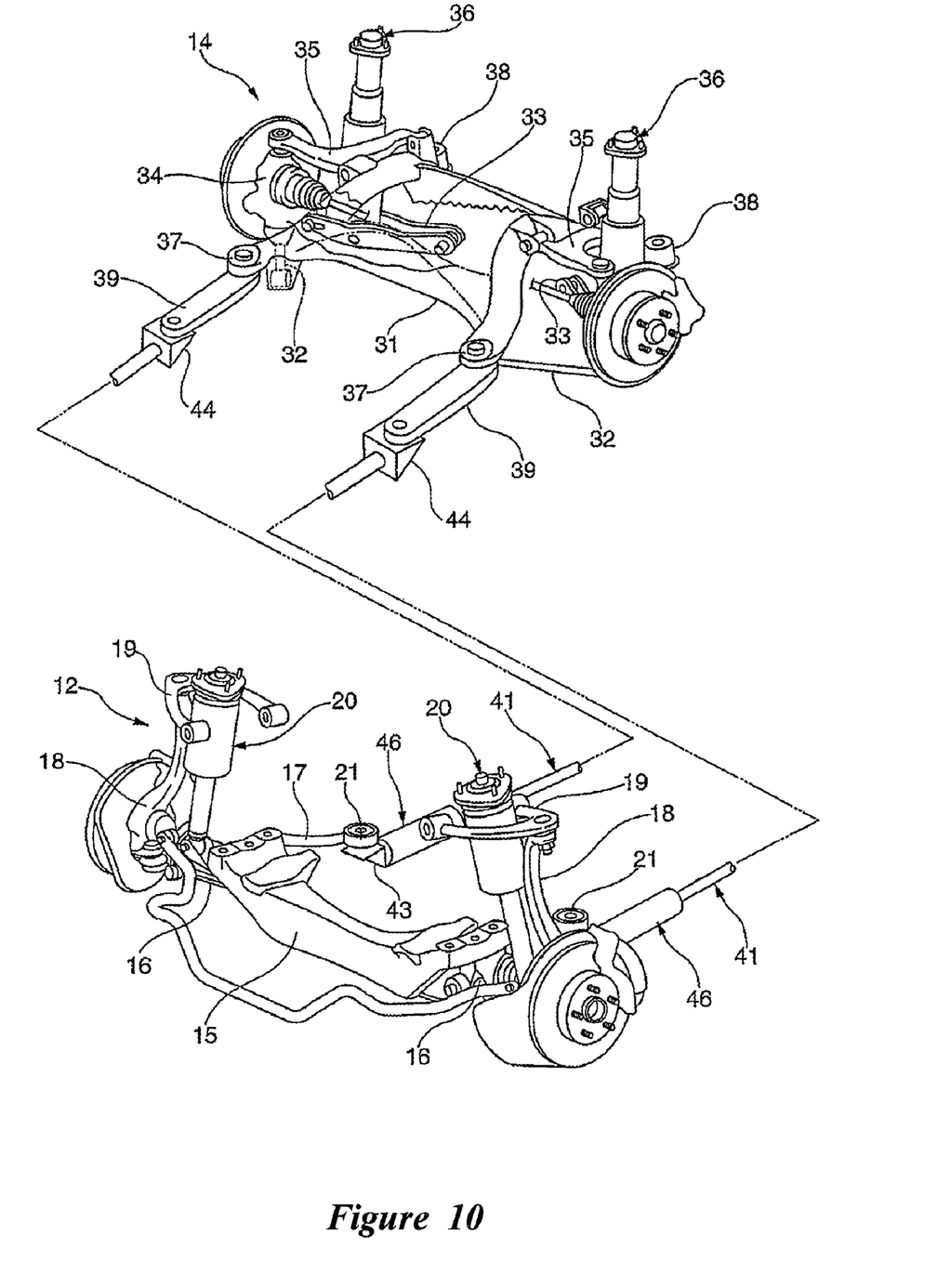
FIG. 10 is a perspective view of another attachment example of a vehicle body reinforcement device.

When only the rear stability brace is provided on the vehicle body frame, the vehicle body reinforcement device 41 may be attached to the vehicle body frame as shown in FIG. 10. FIG. 10 is a perspective view of another example of the vehicle body reinforcement device. In the figure, components the same as or similar to those described in reference to FIGS. 1 through 6 are provided with the same reference numerals and symbols, and their detailed descriptions will not be repeated.

The vehicle body side end (e.g., the connecting member 21) of the rear lower arm 17 of the front wheel suspension system 12 shown in FIG. 10 can be directly supported with the floor panel 4 (not shown) of the monocoque body 1. The front attachment part 37 of the rear cushion member 31 of the rear wheel suspension system 14 can be directly attached to the attachment seat (not shown) for the rear wheel suspension system of the floor panel 4 and also can be connected to part of the floor panel 4 in front of the attachment seat by the rear stability braces 39.

The illustrated vehicle body reinforcement device 41 can have generally the same configuration as that described above. Preferably, the vehicle body reinforcement device extends between the connecting member 21 and the forward portion of the rear stability braces 39.

The forward portion (e.g., the attachment member 43) of the vehicle body reinforcement device 41 can be attached to the floor panel 4 along with the connecting member 21. The rear portion (e.g., the attachment member 44) of the vehicle body reinforcement device 41 can be attached to the floor panel 4 together with the forward portion of the rear stability braces 39.

Thus, longitudinal rigidity can be improved with the vehicle body reinforcement device 41, while reducing vibration generation. The vehicle body reinforcement device 41 extends between part of the floor panel 4 around the area to which longitudinal pressing force is applied from the rear lower arm 17 of the front wheel suspension system 12 and part of the floor panel 4 around the area to which longitudinal pressing force is applied from the front end part of the rear stability brace 39.

When attaching the vehicle body reinforcement device 41 to the vehicle body frame, utilizing the rear lower arm 17 of the front wheel suspension unit 12 and the rear stability brace 39 makes the attachment easier and more economical in comparison with providing dedicated attachment seats on the vehicle body frame.

Although the present invention has been described in terms of certain embodiments, other embodiments apparent to those of ordinary skill in the art in view of the specific disclosed embodiments also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A vehicle comprising a vehicle body frame, a first vehicle body reinforcement device and a second vehicle body reinforcement device;
   each of said first and second vehicle body reinforcement devices comprising an elongated shape, a first end and a second end, means for generating a hydraulic damping force against longitudinal deformation interposed between said first end and said second end;
   said first and second vehicle body reinforcement devices being mounted to said vehicle body frame in a longitudinal orientations while being positioned to opposing lateral sides of said vehicle body frame;
   said first and second ends of each of said first and second vehicle body reinforcement devices being removably attached from outside of said vehicle to parts of said vehicle body frame that are exposed outside of a passenger compartment on a lower portion of said vehicle body; and
   each of said vehicle body reinforcement devices extending between a proximity of part of said vehicle body frame to which a lower arm of a front wheel suspension system is attached and a proximity of part of said vehicle body frame to which a lower arm of a rear wheel suspension system is attached.

2. The vehicle of claim 1, wherein said first and second ends of each of said first and second vehicle body reinforcement devices are attached below a floor panel.

3. The vehicle of claim 1, wherein said first and second ends of each of said first and second vehicle body reinforcement devices are attached outside of respective side sills of said vehicle body frame.

4. The vehicle of claim 1, wherein said vehicle comprises a front wheel and a rear wheel, a distance from said front wheel to said rear wheel defining a wheelbase, at least part of an overall length of said vehicle body reinforcement device is disposed within said wheelbase and said overall length of said vehicle body reinforcement device being greater than or equal to one half of said wheelbase.

5. The vehicle of claim 1, wherein each of said vehicle body reinforcement devices is disposed along a longitudinal extension part of said vehicle body frame, said longitudinal extension parts being formed at laterally separated portions of said vehicle body frame.

6. The vehicle of claim 1, wherein a third vehicle body reinforcement device extends in a lateral direction of said vehicle, said third vehicle body reinforcement device comprising a first end and a second end with said first and second ends being attached to said vehicle body frame.

7. A vehicle comprising a vehicle body frame, a first vehicle body reinforcement device and a second vehicle body reinforcement device;
   each of said first and second vehicle body reinforcement devices comprising an elongated shape, a first end and a second end, means for generating a hydraulic damping force against longitudinal deformation interposed between said first end and said second end;
   said first and second vehicle body reinforcement devices being mounted to said vehicle body frame in a longitudinal orientations while being positioned to opposing lateral sides of said vehicle body frame;
   said first and second ends of each of said first and second vehicle body reinforcement devices being removably attached from outside of said vehicle to parts of said vehicle body frame that are exposed outside of a passenger compartment on a lower portion of said vehicle body; and
   at least one of said first and second vehicle body reinforcement devices extending between part of said vehicle body frame to which a lower arm of a front wheel suspension system is attached and a front end part of a rear stability brace, said rear stability brace extending forward from part of said vehicle body frame to which said rear wheel suspension system is attached and said rear stability brace being attached to said vehicle body frame.

8. The vehicle of claim 7, wherein said first and second ends of each of said first and second vehicle body reinforcement devices are attached below a floor panel.

9. The vehicle of claim 7, wherein said first and second ends of each of said first and second vehicle body reinforcement devices are attached outside of respective side sills of said vehicle body frame.

10. The vehicle of claim 7, wherein said vehicle comprises a front wheel and a rear wheel, a distance from said front wheel to said rear wheel defining a wheelbase, at least part of an overall length of said vehicle body reinforcement device is disposed within said wheelbase and said overall length of said vehicle body reinforcement device being greater than or equal to one half of said wheelbase.

11. The vehicle of claim 7, wherein each of said vehicle body reinforcement devices is disposed along a longitudinal extension part of said vehicle body frame, said longitudinal extension parts being formed at laterally separated portions of said vehicle body frame.

12. The vehicle of claim 7, wherein a third vehicle body reinforcement device extends in a lateral direction of said vehicle, said third vehicle body reinforcement device comprising a first end and a second end with said first and second ends being attached to said vehicle body frame.

13. A vehicle comprising a vehicle body frame, a first vehicle body reinforcement device and a second vehicle body reinforcement device;

each of said first and second vehicle body reinforcement devices comprising an elongated shape, a first end and a second end, means for generating a hydraulic damping force against longitudinal deformation interposed between said first end and said second end;

said first and second vehicle body reinforcement devices being mounted to said vehicle body frame in a longitudinal orientations while being positioned to opposing lateral sides of said vehicle body frame;

said first and second ends of each of said first and second vehicle body reinforcement devices being removably attached from outside of said vehicle to parts of said vehicle body frame that are exposed outside of a passenger compartment on a lower portion of said vehicle body;

at least one of said first and second vehicle body reinforcement device extending between a rear end part of a front stability brace and a front end part of a rear stability brace;

said front stability brace having a front part secured to a central underside of a suspension member of a front wheel suspension system, said front stability brace also having said rear part supporting a lower arm of said front wheel suspension system, said front stability brace being secured to said vehicle body frame; and said rear stability brace extending forward from part of said vehicle body frame to which a rear wheel suspension system is attached, and said rear stability brace being attached to said vehicle body frame.

14. The vehicle of claim 13, wherein said first and second ends of each of said first and second vehicle body reinforcement devices are attached below a floor panel.

15. The vehicle of claim 13, wherein said first and second ends of each of said first and second vehicle body reinforcement devices are attached outside of respective side sills of said vehicle body frame.

16. The vehicle of claim 13, wherein said vehicle comprises a front wheel and a rear wheel, a distance from said front wheel to said rear wheel defining a wheelbase, at least part of an overall length of said vehicle body reinforcement device is disposed within said wheelbase and said overall length of said vehicle body reinforcement device being greater than or equal to one half of said wheelbase.

17. The vehicle of claim 13, wherein each of said vehicle body reinforcement devices is disposed along a longitudinal extension part of said vehicle body frame, said longitudinal extension parts being formed at laterally separated portions of said vehicle body frame.

18. The vehicle of claim 13, wherein a third vehicle body reinforcement device extends in a lateral direction of said vehicle, said third vehicle body reinforcement device comprising a first end and a second end with said first and second ends being attached to said vehicle body frame.

* * * * *